Patented Aug. 27, 1940

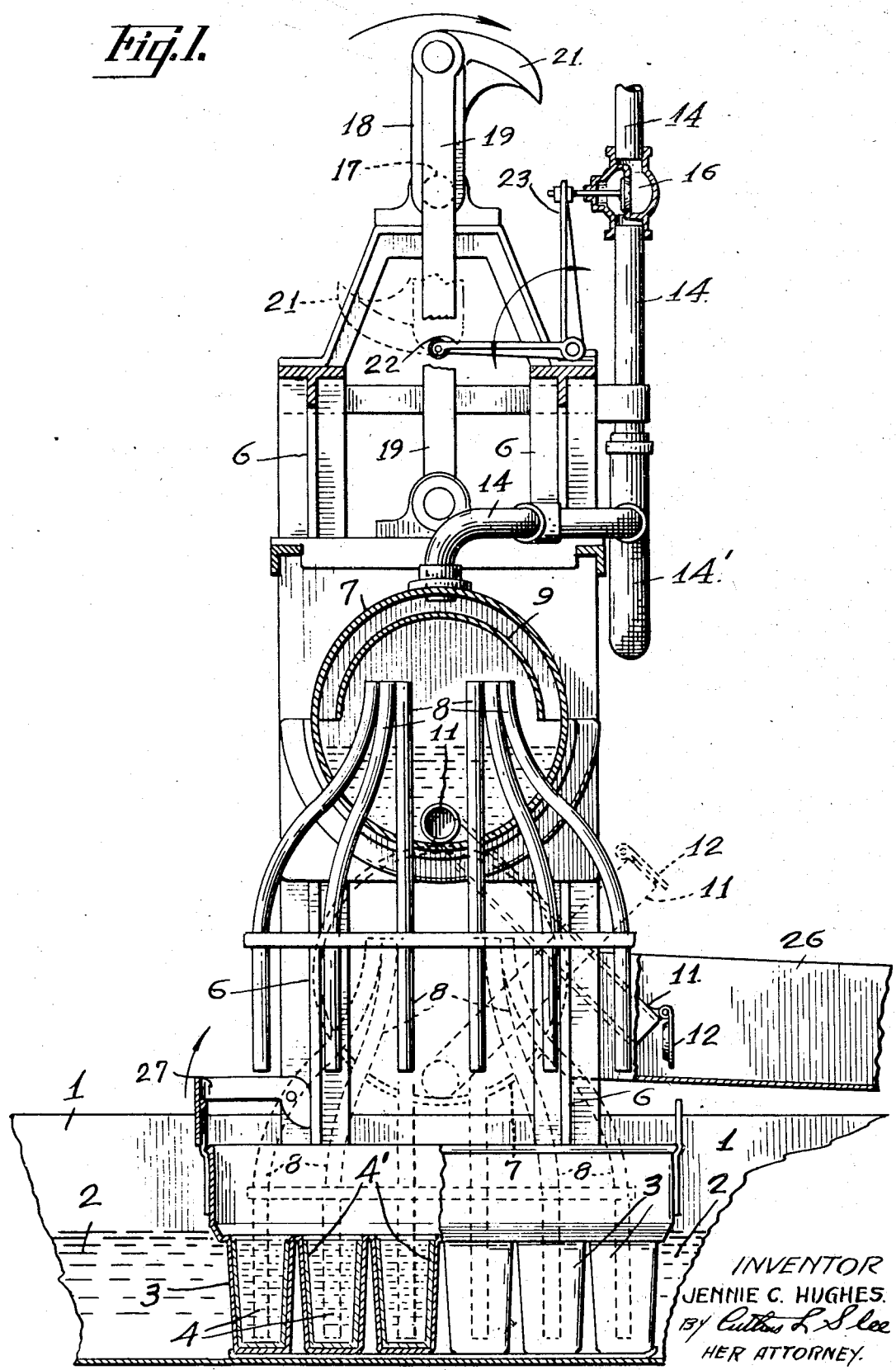

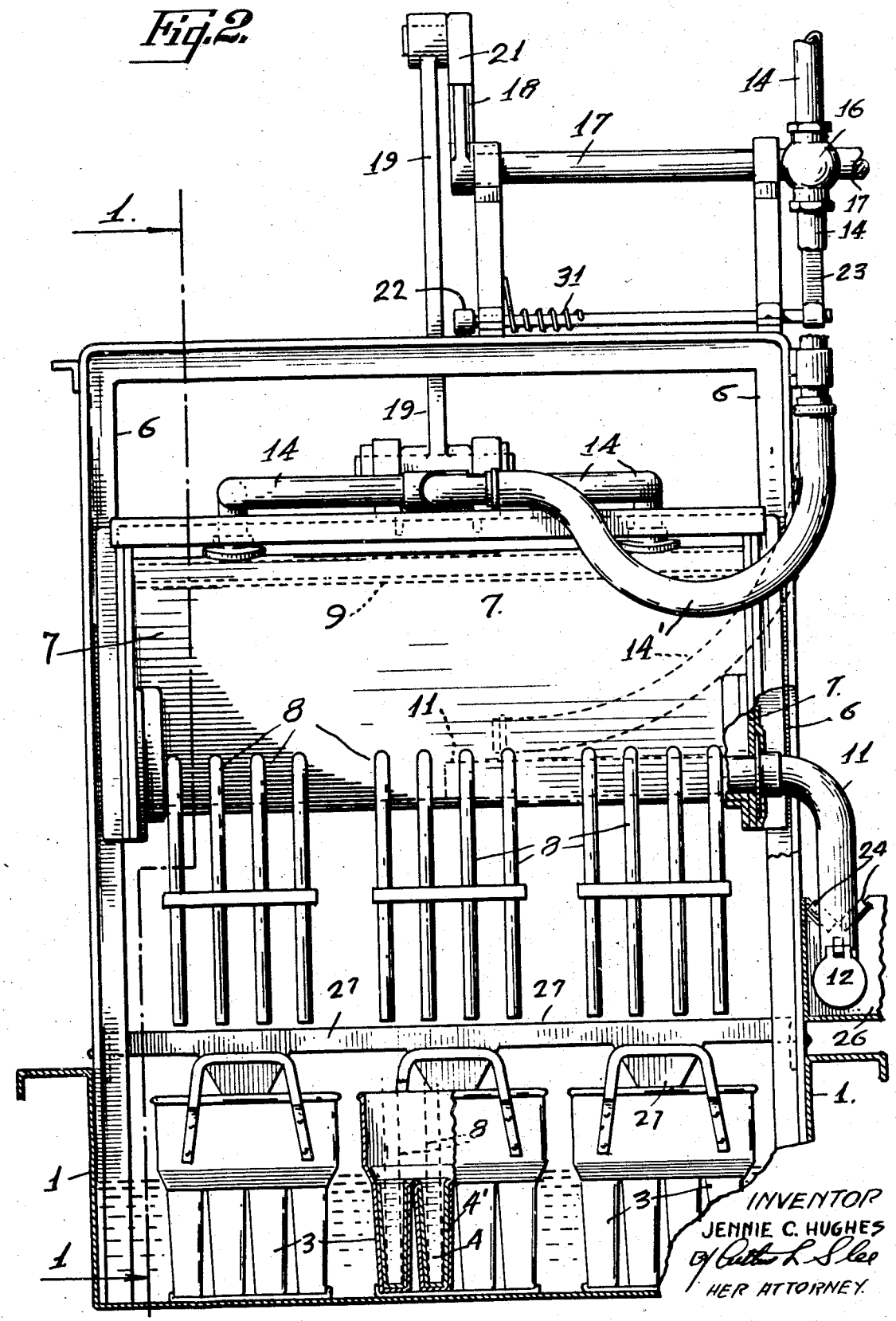

2,212,863

UNITED STATES PATENT OFFICE 2,212,863

EVACUATOR

Jennie C. Hughes, West Sacramento, Calif., assignor of one-third to Eric C. Hughes and one-third to Maxwell B. Hughes, both of West Sacramento, Calif.

Application March 2, 1940, Serial No. 321,979

8 Claims. (Cl. 107—8)

In the production of a frozen confection of the "Popsicle" or "Creamsickle" type, the present practice, especially where two or more ingredients are frozen solidly, one within the other to form the confection, the inner ingredient or core, such as ice cream or the like, is first frozen or congealed within a mold and then removed. It is next placed within a second and larger mold and by means of a stick or handle, suspended in spaced relation to the sides and bottom of said mold and the second liquid ingredient is poured into the space thus formed around said core and the whole is again exposed to a refrigerant and solidly frozen together, said second ingredient forming a casing or protective covering for said core.

The present invention relates to improvements for evacuating the uncongealed or liquid core from the second or outer ingredient as soon as the outer and bottom portions are frozen sufficiently solid to form a hollow casing for the inner ingredient, thereby eliminating the necessity for a double set of molds of different sizes and saving the time, cost and labor now required in the present practice of using two sets of molds.

The primary objects, then, of the present invention is to provide a new and improved evacuator for removing liquid from a mold.

Another object is to provide a new and improved evacuator having improved means for evacuating an uncongealed or liquid core from the outer frozen or congealed ingredient of a frozen confection in order to economically produce an outer hollow casing for said frozen confection.

A further object is to provide a new and improved evacuator of the character described, having improved means for sucking liquid from a mold and into a receiver.

A still further object is to provide a new and improved evacuator of the type set forth, having improved means for draining evacuated liquid therefrom after said liquid has been removed from said molds.

I accomplish these and other objects by means of the improved device disclosed in the drawings forming a part of the present application, and in which—

Fig. 1 is a vertical sectional view taken on line 1—1 of Fig. 2, in the direction indicated; and Fig. 2 is a side elevation of the device, partly in section.

Referring to the drawings:

The numeral 1 is used to designate a tank or trough containing a suitable liquid refrigerant 2 through which are moved molds 3, preferably in groups, and each containing, in liquid form an ingredient for a frozen confection.

The invention comprises a frame of guides 6 mounted upon opposite sides of the trough 1. Slidably mounted on said guides 6 for vertical movement above said molds 3, temporarily arrested in transit through the brine or refrigerant 2, is a receiver 7. A plurality of open pipes 8, one for each mold 3, extends from the upper interior to the lower exterior of the receiver 7 so that a sump is formed below the tops of said pipes 8 within the receiver, the bottoms of said pipes 8 being positioned to enter their respective molds 3 below said receiver 7. A suitable baffle 9 may be provided extending throughout the interior of said receiver 7 and above the pipes 8 therein, to deflect streams emerging from said pipes 8, for a purpose hereinafter more fully set forth.

A normally open drain 11 is pivotally suspended from the receiver 7 and is provided at its lower end with a preferably hinged flap valve 12 arranged to be actuated by the attraction of gravity to close said lower end when the same is elevated above the pivotal point of said drain 11.

A source of suction or vacuum 14 is connected to the top of the receiver 7 and above the baffle 9 therein and may be controlled by a suitable valve 16.

A power shaft 17 is rotatably mounted on top of the frame or guides 6 and is provided with a crank 18 operating a link or connecting rod 19 in turn pivotally connected to the top of the receiver 7, by means of which said receiver may be raised and lowered, when said shaft 17 is slowly rotated, to insert the lower ends of the pipes 8 into the molds 3 and to remove said pipes 8 therefrom.

A suitable cam 21 upon the crank 18 engages one arm of a bell crank, the other arm 23 thereof being operatively connected to the valve 16 of the source of suction 14 to actuate said valve and control said source of suction.

A section 14' of the source of suction 14 is flexible in order that it may follow the receiver 7 when the same is raised and lowered.

The free end of the drain 11 slidably rests upon V-rollers 24 in one end of a drain-trough 26 so that as the receiver 7 is raised and lowered, said free end will be lowered and raised, for a purpose hereinafter set forth.

A suitable stop 27 may be pivotally mounted upon the frame or guides 6 to intercept and hold the molds 3 in proper position relatively to the lower ends of the pipes 8.

In operation:

By means of the stop 27, the molds 3, containing a liquid ingredient 4, are temporarily arrested in their progress through the refrigerant 2 at a point where the outer and bottom portions of said ingredient 4 are frozen sufficiently solid to form a hollow casing 4', containing an uncongealed or liquid core. The present invention is set up at the point in the tank or trough 1 where such step in the freezing process of the ingredient 4 occurs.

As the shaft 17 is slowly rotated, the receiver 7 and pipes 8 depending therefrom are lowered until the lower ends of said pipes 8 are inserted substantially the full depth of the respective molds 3, as disclosed in dotted lines in the drawings. As the lower ends of said pipes 8 are inserted in the liquid 4, the receiver 7 will be closed to the atmosphere through said pipes. Also, while the receiver 7 is being lowered, the V-shaped rollers 24 will prevent descent of the free end of the open drain 11 until said open end is above the pivotal point of said drain, at which time the valve 12 will be actuated by gravity to close the interior of the receiver 7 to the atmosphere through said drain.

As the crank 18 approaches the lowest point in its rotation, the cam 21 thereon will engage the arm 22 of the bell crank and move the other arm 23 thereof to open the valve 16, against the tension of a spring 31, in the suction source 14 and thereby evacuate the atmosphere from the interior of the receiver 7. As the said interior is evacuated, the suction thus produced will operate through the pipes 8 and in turn evacuate the liquid or uncongealed portions of the ingredient 4 from the molds 3 and into the interior of the receiver 7, the baffle 9 operating to prevent any of the projected streams from entering the openings to the source of suction 14 in the top of said receiver 7. Entering the receiver 7, the evacuated liquid will collect in the bottom thereof, but as the free end of the drain 11 is elevated and therefore closed by the valve 12, said liquid is trapped, until the continued rotation of the crank 18 again raises the receiver 7 to upper position. In this upper position the lower ends of the pipes 8 are unsealed or opened thereby opening the interior of said receiver 7 through said pipes. Also, the open drain 11 is lowered, its valve 12 opened and the liquid will be drained through said drain 11 and into the drain-trough 26. Such draining is readily permitted by the closing of the vacuum valve 16. It should be particularly noted that the vacuum valve 16 may be omitted, if desired, where a constant supply of vacuum or suction is not of economic moment.

With suction constantly applied, when the receiver 7 is lowered, the same will be closed to the atmosphere by the submerged pipes 8 and closed drain 11. When raised, the same will be open to the atmosphere through both the pipes 8 and 11 so that evacuated liquid within the receiver 7 may readily flow therefrom.

Having described my invention, I claim—

1. An evacuator for evacuating a mold containing a liquid, comprising suction means; a receiver above said mold; a pipe extending from the upper interior to the lower exterior of said receiver; means for moving said receiver to insert said pipe into said liquid; and means actuated by said movement to connect the interior of said receiver with said suction means.

2. An evacuator for evacuating a mold containing a liquid, comprising a suction means; a receiver above said mold; an open pipe extending from the upper interior to a point below the lower exterior of said receiver; means for moving said receiver to insert the exterior end of said pipe into said liquid; means actuated by the movement of said receiver to connect the same to said suction means to evacuate said liquid from said mold and into said receiver; and means for draining said liquid from said receiver.

3. An evacuator for evacuating a group of molds each containing a liquid, comprising a receiver slidably mounted for vertical movement above said molds; a plurality of open pipes, one for each mold, extending from the upper interior beyond the lower exterior of said receiver; a suction means; a normally closed connection between said mans and the interior of said receiver; means for moving said receiver to insert the exterior ends of said pipes into said molds and liquid and for opening said normally closed connection to said receiver.

4. An evacuator for evacuating a group of molds, each containing a liquid, comprising a receiver slidably mounted for vertical movement above said molds; a plurality of open pipes, one for each mold, extending from the upper interior to beyond the lower exterior of said receiver; a suction means; a normally closed connection between said means and the interior of said receiver; means for moving said receiver to insert the exterior ends of said pipes into said molds and liquid and for opening said normally closed connection to the interior of said receiver; means for moving said receiver and said pipes from said molds; and means for draining said receiver.

5. An evacuator for evacuating a group of molds containing liquid, comprising a receiver slidably mounted for vertical movement above said molds; a plurality of open pipes, one for each mold, extending from the upper interior to beyond the lower exterior of said receiver; a normally open drain connected to said receiver; means for moving said receiver to insert the exterior ends of said pipes into said molds and liquid and for closing said normally open drain; and suction means for moving said liquid through said pipes and into said receiver.

6. An evacuator for evacuating a plurality of molds containing liquid, comprising a receiver slidably mounted for vertical movement above said molds; a plurality of open pipes, one for each mold, extending from the upper interior to beyond the lower exterior of said receiver; suction means connected to said receiver; an open drain pivotally suspended from said receiver; a normally open valve on the suspended end of said drain, said valve being actuated by gravity to close said drain when said suspended end is elevated above the pivotal point of said drain; means for moving said receiver to insert the exterior ends of said pipes into said molds and liquid; means for elevating the suspended end of said drain to close the valve thereon, when said receiver is so moved; and suction means for moving said liquid through said pipes and into said receiver.

7. An evacuator for a plurality of molds containing liquid, comprising a receiver slidably mounted for vertical movement above said molds; a plurality of open pipes, one for each mold, extending from the upper interior to below the lower exterior of said receiver; a suction means connected to said receiver; a normally open drain connected to said receiver; means for moving said receiver to insert the exterior ends of said pipes into said molds; means actuated by said movement for closing said open drain; and means for connecting said suction means with the interior of said receiver.

8. An evacuator for a mold containing a liquid, comprising a receiver slidably mounted for vertical movement above said mold; an open pipe extending from the upper interior to below the lower exterior of said receiver; suction means; a normally closed connection between said suction means and said receiver; a normally open drain pivotally suspended from said receiver; a normally open valve pivotally suspended from the lower end of said drain and actuated by gravity to close said lower end when the same is elevated above its pivotal point; means for moving said receiver to insert the exterior end of said pipe into said mold and liquid therein and to elevate said drain to close the valve thereon; and means actuated by said moving means to open said normally closed connection to the interior of said receiver.

JENNIE C. HUGHES.